No. 890,259. PATENTED JUNE 9, 1908.
W. A. CALLANAN.
GAME PIECE.
APPLICATION FILED FEB. 16, 1907.

2 SHEETS—SHEET 1.

Witnesses

Inventor
W. A. Callanan
By
Attorneys

No. 890,259. PATENTED JUNE 9, 1908.
W. A. CALLANAN.
GAME PIECE.
APPLICATION FILED FEB. 16, 1907.
2 SHEETS—SHEET 2.
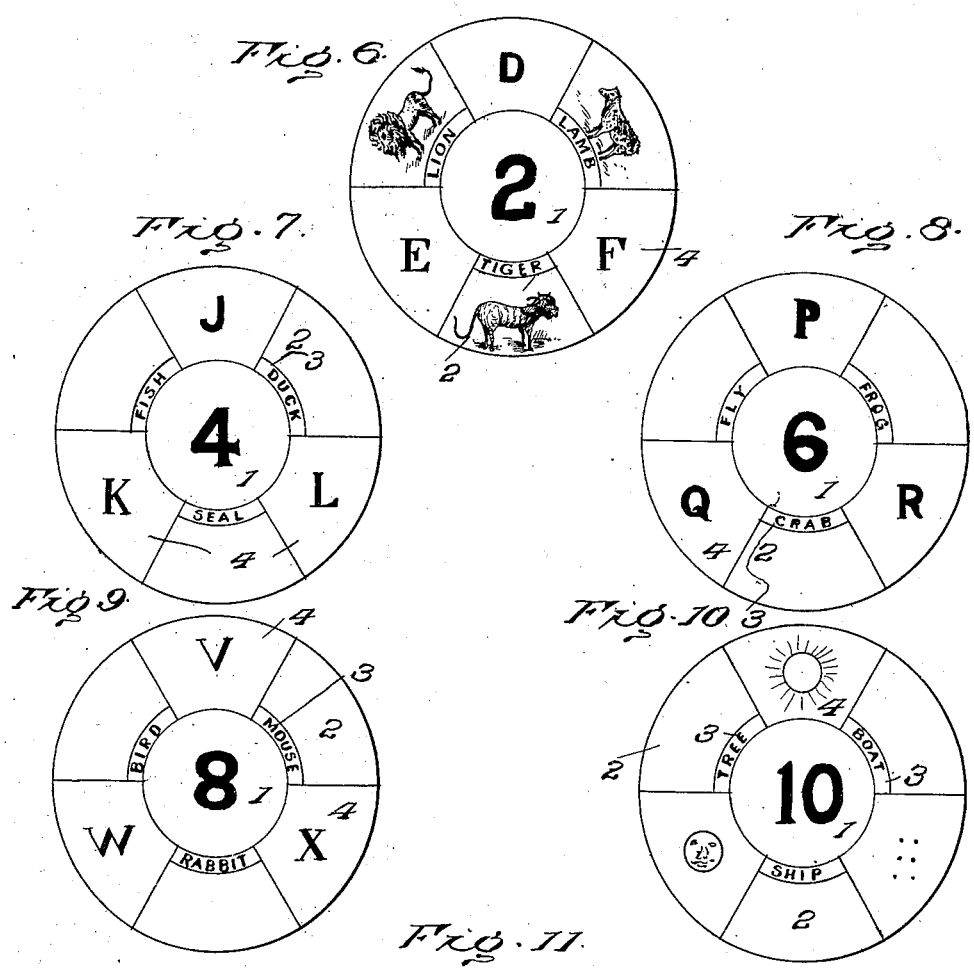

UNITED STATES PATENT OFFICE.

WILLIAM A. CALLANAN, OF JERSEY CITY, NEW JERSEY.

GAME-PIECE.

No. 890,259.      Specification of Letters Patent.      Patented June 9, 1908.

Application filed February 16, 1907. Serial No. 357,621.

*To all whom it may concern:*

Be it known that I, WILLIAM A. CALLANAN, citizen of the United States, residing at Jersey City, in the county of Hudson and State of New Jersey, have invented certain new and useful Improvements in Game-Pieces, of which the following is a specification.

This invention relates to means for affording both pastime and instruction and is designed to engage the attention and prevent lagging in interset in playing the game.

The invention contemplates a series of game pieces and a valuation chart, the game pieces being subdivided into spaces upon which appear characters such as figures representing animals, various structures and the like, names associated with the pictorial representations to identify the same, and numerals and letters, the several characters having a predetermined value designated by the valuation chart and which values are either to be added, subtracted, multiplied or divided as indicated by the said valuation chart.

Figure 1:
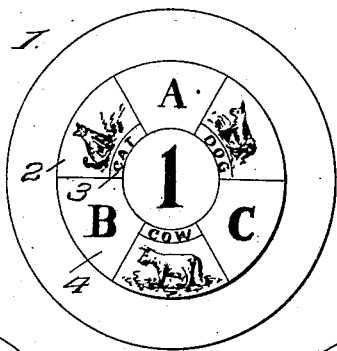
Figure 2:
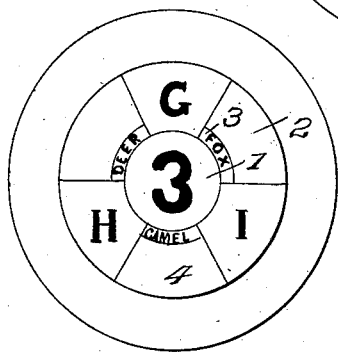
Figure 3:
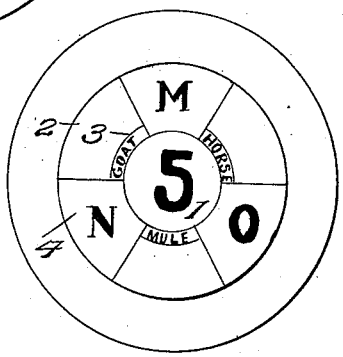
Figure 4:
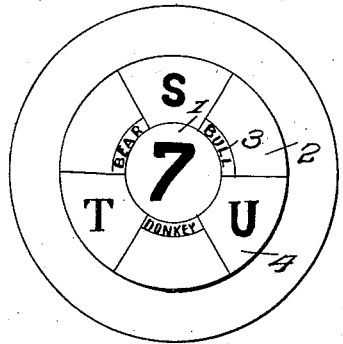
Figure 5:
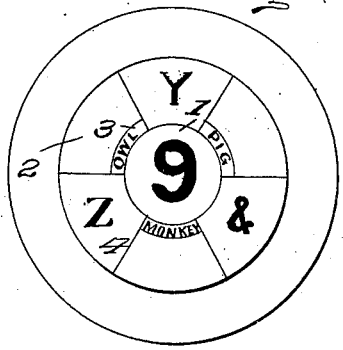
Figure 12:
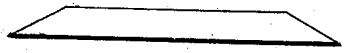

In the accompanying drawings forming a part of the specifications,—Figures 1 to 5 inclusive represent one set of game pieces showing the matter appearing upon one side thereof. Figs. 6 to 10 inclusive represent the same game pieces shown in Figs. 1 to 5 inclusive but showing the reverse side to illustrate the matter appearing thereon. Fig. 11 is a detail view of a valuation chart. Fig. 12 is a side view of one of the game pieces.

Corresponding and like parts are referred to in the following description and indicated in all the views of the drawings by the same reference characters.

The game pieces may be of any material, construction, size and outline. In the preferred embodiment of the invention the game pieces are of circular form and flat, being disks, the edges of which are beveled. The game pieces are of like size and are provided in sets, the one being a duplicate of the other. As shown, five game pieces or disks constitute a set and each game piece is provided upon opposite sides with similar matter, the same consisting of pictorial representations, names of the objects illustrated and associated therewith, and numerals and letters.

Inasmuch as the several game pieces or disks have both sides similarly laid off, a detailed description of one will suffice for a clear understanding of each.

Each side of each game piece or disk is subdivided to provide a central space 1 of circular outline and a series of sector-shaped spaces grouped about the central space. The alternate sector-shaped spaces are subdivided by arcs into outer spaces 2 and inner spaces 3, the latter being comparatively narrow and adapted to bear the names of the objects pictorially represented on the outer spaces 2. The intermediate sector-shaped spaces 4 are provided with letters of the alphabet or other characters representative of elements of the solar system, such as the sun, moon and stars. The center space 1 is provided with numerals ranging from 1 to 10. The pictorial representations familiarize the players with objects such as rare animals, structures and machinery. The association of the names with the several pictorial representations is of advantage from an educational standpoint since the players are enabled to distinguish the several objects pictorially represented by name.

Each character is given an arbitrary value which is determined by the valuation chart and the several values are applied according to directions at the head of columns appearing upon the chart, thereby entailing upon the player arithmetical calculations in order to ascertain the resultant value of each game piece in the play. A side of a game piece is provided with a central space and six sector-shaped spaces grouped about the central space making a total of seven general spaces not counting the subdivisions of the alternate spaces which would make a total of ten spaces. In the valuation chart three columns are provided for the names of the pictorial representation, whereas only one column is provided for the letters appearing on the intermediate spaces 4.

The several columns are provided with directive matter indicating how the value is to be applied. The first column of the valuation chart is headed by the word "Add", the second by the word "Subtract", the third by the words "Multiply by" and the fourth by the words "Divide by." The numerals from 1 to 10 appear in vertical line to the left of the first marked-off column. The first game piece of each set or series is numbered 1 and bears the pictorial representations, a cat, a dog and a cow together with the names thereof which appear in the spaces 3. It also bears the letters A, B and C in the intermediate spaces 4. The reverse side of said game piece as shown in Fig. 6 bears the numeral 2 in the center space and the representations of a lion, a lamb and a tiger together with the names thereof and the letters D, E and F. On reference to the valuation chart, it will be observed that the cat is given the value of 29, the dog 10, the cow 10 and the letters 20. The matter appearing upon the reverse side of the first game piece has 28 for the lion, 11 for the lamb, 9 for the tiger and 19 for the letters. The value of the characters appearing upon each side of the remaining game pieces may be readily ascertained on reference and comparison of said game pieces with the valuation chart. It is to be understood that the values are arbitrary and may be varied but when once determined upon, remain fixed according to the value represented upon the chart.

The game may be played in a variety of ways, such as by rolling the game pieces on the floor towards a given point or by spinning on edge on a table or other smooth surface, or by tossing the same over the head and permitting them to fall on the floor, or by pitching the said game pieces to a line or point. The game pieces whether rolled, spun, tossed or pitched will finally rest upon one side, the other side being uppermost and exposing the matter appearing thereon. The value of each game piece is determined by calculations as indicated by the valuation chart, and the player having a game piece nearest the point or mark, in addition to the sum total of each of his game pieces in play, adds thereto the value of the game piece nearest the mark or point. For example, two players A and B pitch the game pieces, those thrown by A falling with the side up as follows 1, 3, 5, 7 and 9, and B's game pieces falling with the side 2, 4, 6, 8 and 10 uppermost. Upon comparison, it is ascertained that A's game piece bearing the numeral 9 is nearest the mark. A's calculations run as follows as per the valuation chart:

```
1 plus 29 minus 10 multiplied by 10 divided by 20 equal 10
3  "   27   "   12      "       "  8    "    "  18   "    8
5  "   25   "   14      "       "  6    "    "  16   "    6
7  "   23   "   16      "       "  4    "    "  14   "    4
9  "   21   "   18      "       "  2    "    "  12   "    2
                                              Total ........30
Adding the value of the game piece 9, which is..........2
                                              Total ........32 for A.
```

By making like calculations of B's game pieces, it will be found that the sum total is 25, consequently A wins by 7.

Having thus described the invention, what is claimed as new is:

A game piece comprising a flat disk, the faces of the disk being each subdivided into a central circular space bearing a numeral and surrounded by segmental spaces, alternate segmental spaces being subdivided by arcs into outer spaces and inner spaces one of which bears a pictorial representation while the other bears the name of the pictorial representation, and the segmental spaces between the said subdivided segmental spaces bearing letters of the alphabet.

In testimony whereof I affix my signature in presence of two witnesses.

WILLIAM A. CALLANAN. [L. S.]

Witnesses:
  JOHN CODY,
  NICHOLAS F. WALSH.